United States Patent [19]
Akeley

[11] 3,779,076
[45] Dec. 18, 1973

[54] FLOW METERING RUN WITH ORIFICE PLATE

[75] Inventor: Lloyd T. Akeley, Fullerton, Calif.

[73] Assignee: Beckman Instruments, Inc., Fullerton, Calif.

[22] Filed: Apr. 17, 1972

[21] Appl. No.: 244,415

[52] U.S. Cl. .............................................. 73/211
[51] Int. Cl. .............................................. G01f 1/00
[58] Field of Search ................ 73/211, 213, 205 R; 138/40, 44

[56] References Cited
UNITED STATES PATENTS
3,026,727  3/1962  Spurling .............................. 73/211
3,374,673  3/1968  Trageser ............................. 73/204
3,521,487  7/1970  Akeley ................................ 73/211

Primary Examiner—Richard C. Queisser
Assistant Examiner—John P. Beauchamp
Attorney—James M. Thomson et al.

[57] ABSTRACT

A flow metering run with an orifice plate for use with a differential pressure instrument for accurately measuring low flow rates of fluids. The flow metering run comprises a pair of flange connectors each having an internal chamber formed therein communicating with an outlet opening that is adapted to sealingly engage a high or low pressure inlet of the DP instrument. The internal chambers are interconnected by a pressure duct. A removable orifice plate is provided across the outlet opening of the low pressure flange connector and a straight flow inlet pipe having smooth inner surfaces and a length approximately ten times its diameter is connected into the low pressure internal chamber. The inlet pipe is aligned with the orifice plate so that a straight flow path through the low pressure side of the DP instrument is achieved. A screen is removably mounted across the flow inlet pipe about two pipe diameters upstream of the orifice plate to produce turbulent fluid flow into the orifice.

8 Claims, 3 Drawing Figures

FLOW METERING RUN WITH ORIFICE PLATE

BACKGROUND OF THE INVENTION

This invention relates to the measurement of fluid flow with flow rate meters of the "head" type. Generally, this type of measurement is based upon monitoring the differential pressure generated by the flow of fluid through fluid runs including a restriction, such as an orifice inserted in a flow pipe. The differential pressures, i.e. the difference between the high pressure appearing above the orifice plate and the low pressure appearing below the orifice plate, are applied to a differential pressure transmitter which includes a transducer adapted to provide an output signal representative of the flow rate of the fluid. Differential pressure transmitters or instruments adapted for measuring such pressures are well known in the art.

Various problems arise in designing a meter run to mount upon and operate in conjunction with a standard differential pressure transmitter. Accuracy problems occur due to the various parameters that affect the accuracy of flow metering, especially where the metering run is to handle a variety of fluids of different viscosities over a large range of velocities and Reynolds number. For example, the ratio of orifice to pipe diameter, the concentricity of the orifice to the pipe, pipe roughness, and any upstream configuration which will affect the pattern of flow approaching the orifice plate can all affect the accuracy of the measurements. More particularly, it should be understood that an ideal flow metering run-transmitter combination would provide a predictable flow coefficient for each orifice it is designed to utilize, provide easy changing of the orifice, and be easy to clean and service. This in turn would enable reliable and accurate measurements to be made over a wide range of flow rates with a variety of fluids.

Various attempts have been made to produce flow meter runs which have predictable accuracy. One such flow meter run is described in U.S. Pat. No. 3,521,487 to Lloyd T. Akeley, the inventor herein. The flow meter run described in that patent produces results which are satisfactory in some applications. However, the patented flow meter run involves the use of complex pressure tap output passages for conveying both the high pressure and the low pressure between the meter run and the differential pressure transmitter. These complex pressure tap output passages are objectionable because with dirty fluids they fill with dirt and require frequent servicing for cleanout.

Other flow meter runs in the prior art use the high pressure side of the DP instrument as the upstream portion of the flow meter run. With this approach the fluid flows through the high pressure side of the DP instrument before it reaches the orifice. A fluid duct then conducts low pressure fluid to the low pressure side of the DP instrument to complete the pressure drop measurement. This arrangement has the simplicity and servicability desired. However, it is now known that the upstream configuration of the flow run is most important in maintaining a predictable flow coefficient. The transmitter pressure body with its odd configuration does not provide a satisfactory upstream flow approach to the orifice. Use of the transmitter flow body on the other hand, downstream of the orifice is not objectionable. Therefore improvement in the accuracy of such prior art devices is possible.

OBJECTS OF THE INVENTION

Accordingly it is an object of the invention to provide an improved flow meter run with an orifice plate, having a preferred configuration on the upstream or high pressure side of the orifice plate.

It is another object of the invention to provide an improved flow meter run with an orifice plate, for maintaining predictable flow coefficients over a wide range of flow rates.

It is a further object of the invention to provide an improved flow meter run with an orifice plate which, when mounted on a differential pressure instrument, permits fluid flow straight through the low pressure body of the differential pressure instrument.

It is yet another object of the invention to provide a flow meter run of the above type which is adapted for assembly with a standard DP transmitter, forming a combination which is easy to use and service.

It is yet a further object of the invention to provide a flow meter run which is adapted to seat independently upon the pressure bodies of the differential pressure instrument.

These and other objects of the invention are attained in a flow meter run design which includes a pair of flange connectors each having an internal chamber formed therein communicating with an outlet opening that is adapted to be sealably engaged with a corresponding high or low pressure inlet connection of a DP instrument. The internal chambers are interconnected by a pressure duct. An orifice plate is provided across the outlet opening of the low pressure flange connector and a straight flow inlet pipe having smooth inner surfaces and a length approximately ten times its diameter is connected into the low pressure internal chamber, aligned with the orifice plate so that a straight through flow path past the low pressure side of the DP instrument is provided. A screen is removably mounted across the flow inlet pipe about two pipe diameters upstream of the orifice plate to produce turbulent fluid flow on the upstream side of the orifice.

BRIEF DESCRIPTION OF THE DRAWINGS

The above and other objects and features of the invention will become apparent from the following detailed description, taken in conjunction with the accompanying drawings wherein.

DETAILED DESCRIPTION OF THE INVENTION

Figure 2:
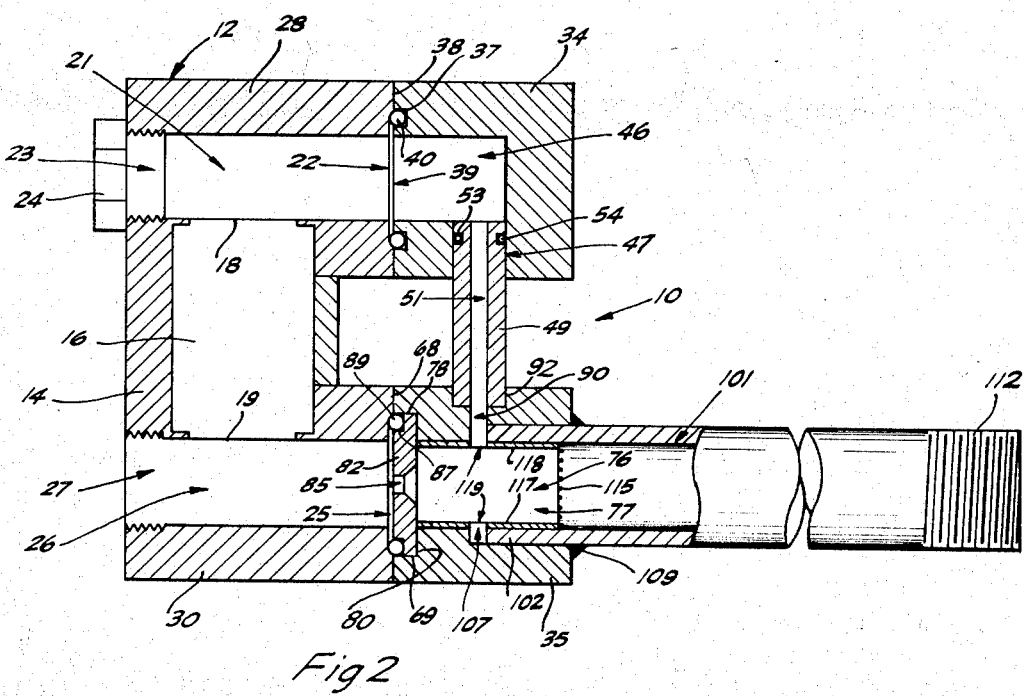
FIG. 2 is a side view, in section, of the preferred embodiment taken along lines 2—2 of FIG. 1.
Figure 3:
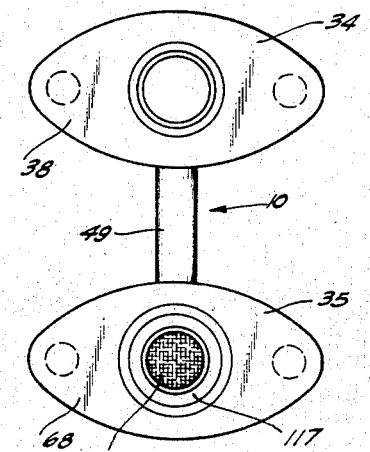
FIG. 3 is a front view of the preferred embodiment, removed from the differential pressure instrument.
Figure 1:
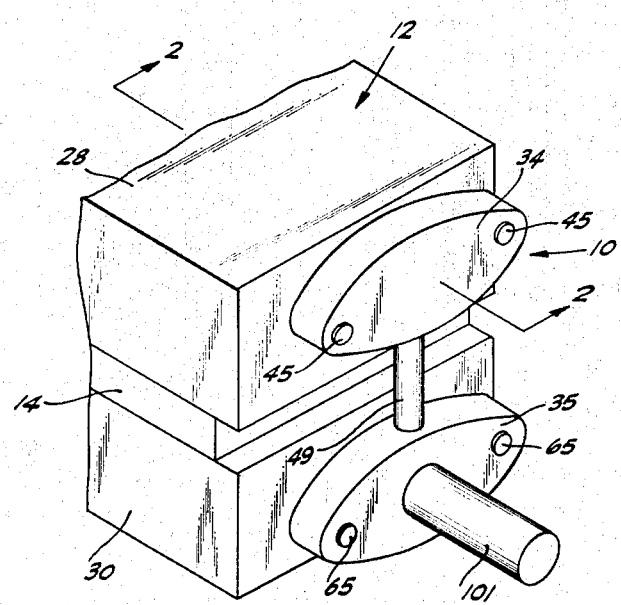
FIG. 1 is a perspective view of one preferred embodiment of the invention interconnected with a differential pressure instrument of conventional design.

Referring now to the drawings, one preferred embodiment of the invention is illustrated comprising a flow run 10 interconnected with a differential pressure instrument 12 of conventional design. Referring particularly to FIG. 2, the differential pressure instrument 12 includes a central capsule 14 having a differential pressure transducer 16 therein with a high pressure diaphragm 18 and a low pressure diaphragm 19. Transducer 16 is adapted to produce an electrical output signal proportional to the difference between pressure applied to diaphragms 18, 19 respectively, in well known fashion. The DP instrument otherwise includes a high pressure chamber 21 in high pressure body 28 having an inlet opening 22 and an outlet opening 23 closed by a threaded plug 24. Likewise, the instrument includes a low pressure chamber 26 in low pressure body 30 having an inlet opening 25 and an outlet opening 27 adapted for providing flow of fluid past diaphragm 19.

Flow run 10 is adapted for removable connection with pressure bodies 28 and 30, respectively, of the differential pressure instrument. For this purpose, the flow run includes flange connectors 34, 35 corresponding, respectively, to high pressure body 28 and low pressure body 30. Flange connector 34 is provided with a circular recessed groove 37 in a face 38 of the flange connector surrounding an outlet opening 39. An O-ring 40, of rubber or other suitable resilient material, is provided in groove 37 so that sealed contact can be formed between flange connector 34 and body 28. The pressure tight seal is maintained by the O-ring when compressed under the force of bolts 45 which extend through suitable openings in the flange connector and engage corresponding threaded holes in body 28.

Outlet opening 39 communicates with an internal chamber 46 of the flange connector, which in turn communicates with an inlet opening 47 formed in the lower side of the flange connector. Inlet opening 47 is adapted to receive one end of a pressure duct 49 having a central bore 51 formed therein. The received end of duct 49 is formed with a recessed groove 53 around its periphery in which a resilient O-ring 54 is secured. Suitable tolerance is provided between the outside diameter of duct 49 and the inside diameter of opening 47 so that duct 49 can be removed from the flange connector to permit cleaning. However, groove 53 with O-ring 54 seated therein, cooperates with the periphery of opening 47 to provide a pressure tight seal therebetween when duct 49 is inserted into the opening. The freedom of duct 49 with respect to inlet opening 47 also permits rotational movement therebetween. This enables the flange connectors of the flow meter run to seat independently against the corresponding pressure bodies of the DP instrument so that the likelihood of leakage at the junctures is reduced.

Flange connector 35 also includes a central chamber 76 having an outlet opening 69 and an inlet opening 77 thereto. The outlet opening opens upon a face 68 of the flange connector which is adapted to seat against the corresponding face of pressure body 30 of the DP instrument. In a fashion similar to flange connector 34, bolts 65 are provided, extending through suitable openings in the flange connector and engaging corresponding threaded holes in pressure body 30. A recess 78 is formed in face 68 around the periphery of outlet opening 69. The recess defines a shoulder 80 against which the edge of the back surface of an orifice plate 82 is adapted to seat. Orifice plate 82 has a circular outer periphery, to match circular opening 69, and a central aperture 85 of circular diameter, through which the fluid flows. Orifice plate 82 also has a recessed portion around the outer periphery of the front or downstream side defining a shoulder 87 thereon. Shoulder 87 cooperates with shoulder 80 formed about the outlet opening to define a groove in which a resilient O-ring 89 is seated to form a seal between low-pressure body 30, orifice plate 82, and connector flange 35. It should also be apparent that orifice plate 82 is removably and sealably confined within the flange connector and can be easily exchanged by removing the flange connector.

A vent 90 is formed in the flange connector communicating with central chamber 76. The vent terminates in an enlarged outer recess 92 adapted to receive the other end of fluid duct 49. A permanent connection, such as a welded joint, is formed between duct 49 and flange connector 35 about the periphery of recess 92.

A straight flow inlet pipe 101 is also provided having a first end 102 that extends through inlet opening 77 in the flange connector and comprises an inner sleeve surrounding part of chamber 76. End 102 of the pipe terminates short of side vent 90, thereby defining a recess 107 about the periphery of chamber 76 so that the inlet pipe communicates with the inner bore of pressure tube 49. Flow inlet pipe 101 has a smooth inner surface, which can be provided by suitable machining or surfacing operations, and the inlet pipe preferably has a length approximately ten times its inside diameter. In the embodiment illustrated the pipe has an inside diameter of about 0.500 inches, although other pipe diameters could be used. The relationship of the length to the diameter is such that straight fluid flow occurs through the upstream configuration of the flow meter with a reasonably predictable flow pattern. It has been found that a length of ten times the inside diameter of the inlet pipe is one preferred configuration. The flow inlet pipe is permanently joined to flange connector 35, such as by a welded joint 109.

The other end of inlet pipe 101 is provided with a threaded outer portion 112 by which the flow meter run is adapted to be connected to a suitable source of fluid to be measured.

A mesh or screen 115 is provided within the inner bore of inlet pipe 101, being suspended approximately two pipe diameters upstream from the orifice plate. The screen is welded to removable cylindrical sleeve 117 at end 118. Radial holes 119 are formed in the wall of sleeve 117 adapted to communicate with recess 107 and bore 51. The downstream end of sleeve 117 rests against the upstream side of orifice plate 82. Accordingly the screen can be easily removed for cleaning or replacement in the same fashion as the orifice plate.

The removable screen 115 is a flow straightener. At low flow rates and/or with viscous fluids the screen helps to maintain desired turbulent flow upstream of the orifice and thus to provide constant flow coefficient at lower flow rates.

The flow meter run described herein has been found to provide accurate fluid measurements with a flow coefficient that is nearly constant with differential pressures to the DP instrument ranging from 10 to 200 inches H$_2$O.

With regard to the term "flow coefficient," equation 1 set forth below relates to incompressible flow rate as defined by ASME Flow Measurement PTC 19.5:

$$W_h = 359 \ CFF_a d^2 \ \sqrt{h_w y} \tag{1}$$

where $W_h$ = flow rate in lb./hr.
$C$ = coefficient of discharge
$F$ = velocity of approach factor = $1/\sqrt{1-B^4}$
$B = d/D$
$d$ = orifice throat diameter in inches
$D$ = pipe inside diameter in inches
$F_a$ = correction for the temperature of the pipe and orifice $h_w$ = the pressure drop across the orifice in inches of water Y = flow fluid specific weight in lbs./ft.$^3$ The term flow coefficient, as used herein, is defined as $C_d = FF_aC$. Thus, the incompressible flow equation becomes:

$$W_h = 359 \, C_d \, d^2 \, \sqrt{h_w Y} \qquad (2)$$

Aside from providing relatively constant flow coefficients over a wide range of flow rates the flow meter run described herein is advantageous in that it can be easily installed and disassembled for cleaning or maintenance. Furthermore, the construction of the flow meter run is such that it independently seats against the pressure bodies of the DP instrument and thereby reduces the likelihood of leakage at those junctures.

I claim:

1. A flow run for connection to a differential pressure instrument of the type having a high pressure body with an inlet of predetermined diameter and a low pressure body having a through-flow passageway with an inlet of predetermined diameter, said flow run comprising:
   a low pressure flange connector and a high pressure flange connector, each having an internal chamber formed therein communicating with an outlet opening, the outlet openings of said flange connectors conforming in diameter to the inlets of the high and low pressure bodies respectively of the differential pressure instrument to which the flow run is to be connected for sealing engagement with the inlets of said high and low pressure bodies, respectively, of the differential pressure instrument,
   fluid duct means interconnecting said internal chambers,
   an orifice plate having an aperture therein, removably supported across the outlet opening of the low pressure flange connector and
   a straight fluid inlet pipe connected into the internal chamber of the low pressure flange connector, said pipe having its axis of flow aligned with the aperture of the orifice plate to provide a straight flow path into the low pressure side of the differential pressure instrument, said inlet pipe having smooth inner surfaces and a controlled diameter and length.

2. The flow run assembly of claim 1 further including a screen-type flow straightener removably secured within said fluid inlet pipe upstream of said orifice plate.

3. The flow run assembly of claim 2 wherein said fluid duct means comprises a duct having a central bore therethrough, one end of said duct being fixed to one of said flange connectors and the other end of said duct being removably and sealingly engaged with the other of said flange connectors.

4. The flow meter run of claim 2 wherein said flow inlet pipe has an inside diameter of 0.500 inches and a length ten times the inside diameter.

5. The flow meter run of claim 2 wherein said screen comprises a fine wire mesh suspended two inlet pipe diameters upstream from the orifice plate.

6. The flow run assembly of claim 1 wherein the straight fluid inlet pipe has an inside diameter greater than the diameter of the aperture in the orifice plate and the length of the fluid inlet pipe is approximately ten times the inside diameter.

7. The flow run assembly of claim 2 wherein the screen type flow straightener comprises a fine wire mesh extending across the inside diameter of the straight fluid inlet pipe and lies along a plane substantially perpendicular to the axis of the straight fluid inlet pipe.

8. A flow meter comprising in combination:
   a differential pressure transducer,
   a housing for the transducer having a high pressure body and a low pressure body, the bodies having passageways communicating with the differential pressure transducer, each body-passageway having an inlet, with the passageway in the low pressure body constituting a through flow passageway for fluid the flow rate of which is to be measured, a low pressure flange connector having an internal chamber formed therein with an outlet opening communicating with the inlet of the low pressure body of the differential pressure transducer, a high pressure flange connector having an internal chamber formed therein with an outlet opening communicating with the inlet of the high pressure body of the differential pressure transducer,
   fluid duct means interconnecting said internal chambers,
   an orifice plate having an aperture therein, removably supported across the outlet opening of the low pressure flange connector and
   a straight fluid inlet pipe connected into the internal chamber of the low pressure flange connector, said pipe having its axis of flow aligned with the aperture of the orifice plate to provide a straight flow path into the low pressure side of the differential pressure transducer, said inlet pipe having smooth inner surfaces and a controlled diameter and length.

* * * * *